United States Patent Office 3,489,600
Patented Jan. 13, 1970

3,489,600
OXYMETHYLENE POLYMER-MICROCRYSTAL-
LINE WAX ARTICLE
John S. Millar, Charlotte, N.C., assignor to Celanese
Corporation, a corporation of Delaware
No Drawing. Filed Feb. 8, 1966, Ser. No. 525,846
Int. Cl. B44d 1/22
U.S. Cl. 117—138.8                                3 Claims

ABSTRACT OF THE DISCLOSURE

The resistance to permeation by water of an oxymethylene polymer article is enhanced by coating at least one surface with a microcrystalline wax. This reduced rate of permeation by water in any form thereby minimizes the loss of aqueous products that may be packaged or contained in a container made of this polymer.

The present invention relates to oxymethylene polymer articles, such as sheets, films, bottles, and containers, which have enhanced resistance to permeation by water. More particularly, the invention relates to oxymethylene polymer containers having at least one surface modified by the application of an adherent coating of a microcrystalline wax in order to reduce the rate of permeation of water through the polymer.

Oxymethylene polymers having successive oxymethylene groups can be prepared by the polymerization of trioxane or formaldehyde. These polymers, which are normally thermoplastic materials, have a unique combination of stiffness, toughness, and inertness and as a result, have achieved widespread use in molded and extruded objects. One area in which the use of the oxymethylene polymers has been somewhat limited, however, is as containers, bottles, and the like, primarily because of the high rate of permeation of water through the oxymethylene polymer.

Accordingly, the primary object of the present invention is to provide an oxymethylene polymer article having enhanced resistance to permeation by water.

Another object is to provide an oxymethylene polymer article having at least one surface containing an adherent coating which will reduce permeation of the article by water.

A further object is to provide an oxymethylene polymer container having an adherent wax coating on the interior and/or exterior surface thereof so as to reduce permeation of the container by water.

Generally described, the present invention comprises an oxymethylene polymer article having enhanced resistance to permeation by water, the article comprising an oxymethylene polymer in mutual contact with a microcrystalline wax. In its more preferred embodiment, the present invention comprises an oxymethylene polymer article, particularly a container, having at least one surface thereof coated with a microcrystalline wax.

With respect to coating an oxymethylene polymer article with microcrystalline wax, it has been found that surprisingly good adhesion of the microcrystalline wax directly to the oxymethylene polymer surface is obtained without application of any adhesive subcoat or pretreatment of the polymer surface being required. In contrast to microcrystalline wax, when other wax materials such as paraffin wax were used in a similar manner they formed poor bonds with the oxymethylene polymer surface, and resulted in much higher water permeation rates. In other instances, coatings made of wax other than microcrystalline wax were quite brittle and easily cracked.

The microcrystalline wax greatly reduces the rate of permeation of the oxymethylene polymer by water in any form and thereby minimizes losses of aqueous products that may be packaged or contained in a container made of this polymer. The present invention thus enhances the effectiveness of oxymethylene polymer as a container material for aqueous compositions, including both liquid mixtures or solutions of water with some other material as well as water vapor.

The microcrystalline waxes which are used in the present invention are defined as waxes derived from petroleum and characterized by the fineness of their crystals in distinction to the larger crystals of paraffin waxes. The microcrystalline waxes consist of saturated aliphatic hydrocarbons such as $C_{48}H_{98}$, and normally have an aromatic content below 1 percent by weight. As is otherwise well-known, the microcrystalline waxes are obtained from petroleum by dewaxing residual stocks and removal of any petroleum oil that may be contained in the resulting wax cut by extraction with a conventional solvent such as methyl butyl ketone. The resulting microcrystalline wax product has a melting point varying from about 140 to 200° F., and a molecular weight of from about 450 to 1000 (normally an average molecular weight of from about 650 to 700). A typical microcrystalline wax suitable for use in the present invention has a specific gravity (at 60° F.) of from about 0.92 to 0.94 and a melting point of from about 190 to 195° F.

Any form of mutual contact between the oxymethylene polymer and the microcrystalline wax may be used in the present invention. Preferably, a coating of the microcrystalline wax is applied to at least one surface of the oxymethylene polymer article. For example, the microcrystalline wax can be melted and the oxymethylene polymer article dipped into a bath of the wax, or the melted wax can be sprayed or padded onto the polymer article. When the interior and/or exterior of an oxymethylene polymer bottle are to be coated, the exterior coated is conveniently applied by dipping the bottle into a melt bath of wax, and the interior coating is applied by spraying in any suitable manner. For example, spray nozzles may be inserted into the bottle and melted wax sprayed onto the surface. If desired, the wax coating may also be applied by dissolving the microcrystalline wax in a low boiling solvent such as cyclohexane, acetone, and the like, appplying the solvent mix to the oxymethylene polymer article, and thereafter removing the solvent by drying.

In order to achieve the desired reduction in permeation, a microcrystalline wax coating in the range of from about 0.2 to 10 mils or higher, and preferably from about 1 to 5 mils is applied to the oxymethylene polymer article. It is difficult to obtain a uniform coating of wax below about 0.2 mil as open areas frequently appear on the article. While coatings above 10 mils can be used, the improvement in permeation reduction is usually offset by the cost of adding the additional wax thickness.

In addition to applying a coating of the wax, microcrystalline wax may be blended or mixed with the oxymethylene polymer, for example, in powder form, and the blend then formed or molded into any desired shape. When the wax and oxymethylene polymer are blended significant reduction in water permeability is obtained when an amount of microcrystalline wax in the range of from about 0.005 to 1.5 percent by weight of the polymer, and preferably from about 0.05 to 0.5 percent is used. When more than about 1.5 percent of microcrystalline wax is blended with the polymer, microfissures or cracks may develop during quenching of the subsequently molded article or container.

Preferably, when the materials are to be blended, the desired amount of microcrystalline wax is dissolved in a solvent, such as cyclohexane, and oxymethylene polymer added thereto. The materials are then blended by any commonly used means such as a Banbury mixer. The presence of the solvent is desirable in order to mix the small amount of microcrystalline wax uniformly throughout the polymer. After the mixing is completed the solvent is removed by drying. The powdered mixture of wax and polymer may then be molded, for example, by heat extrusion. Other mixing means such as dry blending, and the like may be used to mix the oxymethylene polymer and microcrystalline wax provided a uniform mixture is obtained.

The term "oxymethylene polymers" as used herein, relates to those polymers having recurring oxymethylene units and may be prepared by the polymerization of formaldehyde or trioxane, a cyclic trimer of formaldehyde. Suitable oxymethylene polymers include oxymethylene homopolymers and copolymers. Preferred oxymethylene copolymers are those containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and do not induce undesirable reactions under the conditions involved. Particularly preferred are copolymers which contain from 60 to 99.6 mol percent of recurring oxymethylene groups and from 0.4 to about 40 mol percent of —OR— group. Most preferred are those polymers having from 85 percent to 99.6 mol percent of recurring oxymethylene groups and from 0.4 to 15 mol percent of —OR— groups. In a preferred embodiment R may be, for example, an alkylene or substituted alkylene group containing at least two carbon atoms.

Among the oxymethylene copolymers which may be utilized in accordance with this aspect of the invention are those having a structure comprising recurring units having the formula

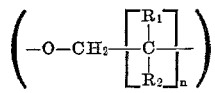

wherein $n$ is an integer from zero to 5 and wherein $n$ is zero in from 60 to 99.6 mol percent of the recurring units. $R_1$ and $R_2$ are inert substituents, that is, substituents which are free of interfering functional groups and will not induce undesirable reactions.

A preferred class of oxymethylene copolymers are those having a structure comprising oxymethylene and oxyethylene recurring units wherein from 60 to 99.6 mol percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

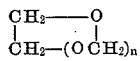

where $n$ is an integer from zero to 2.

Examples of preferred oxymethylene polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, assigned to the Celanese Corporation of America.

Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal, pentaerythritol diformal; paraldehyde; tetrahydrofuran and butadiene monoxide.

As used in the present invention, the term "oxymethylene" includes substituted oxymethylene, where the substituents are inert with respect to the reactions in question, that is, the substituents are free of interfering functional groups and will not introduce undesirable reactions.

As used in the present invention, the term "copolymer" means polymers having two or more monomeric groups, including terpolymers and higher polymers. Suitable oxymethylene terpolymers include those disclosed in U.S. patent application Ser. No. 229,715, filed Oct. 10, 1962, now abandoned by W. E. Heinz and F. B. McAndrew, which is assigned to the Celanese Corporation of America.

The preferred oxymethylene polymers which are used in the present invention are thermoplastic materials having a melting point of at least 150° C. and are normally millable at a temperature of 200° C. They have a number average molecular weight of at least 10,000. These polymers have a high thermal stability. The preferred oxymethylene polymers which are used herein have an inherent viscosity of at least one (measured at 60° C. in a 0.1 weight percent solution in p-chlorophenol containing 2 weight percent of α-pinene). The preferred oxymethylene copolymers exhibit remarkable alkaline stability. For example, if the chemically stabilized copolymers are refluxed at a temperature of about 142 to 145° C. in a 50 percent solution of sodium hydroxide in water for a period of 45 minutes, the weight of the copolymer will be reduced by less than one percent.

The preferred oxymethylene copolymers are preferably stabilized by degradation of the molecular ends to a point where a stable carbon-to-carbon linkage exists at each end.

Thermal degradation, as disclosed in U.S. Patent 3,103,499 by Thomas J. Dolce and Frank M. Berardinelli, or degradation by hydrolysis, as disclosed in application Ser. No. 102,097, filed Apr. 11, 1961, now abandoned by Frank M. Berardinelli, may be used. These applications are assigned to the Celanese Corporation of America.

Other suitable oxymethylene polymers and methods of preparation therefor are disclosed in an article Kern et al. Angewandt Chemie, 73(6), 177–186 (Mar. 21, 1961), including polymers containing repeating carbon-to-carbon single bonds in the polymer chain by copolymerizing trioxane with cyclic ethers such as dioxane, lactones such as betapropiolactone, anhydrides such as cyclic adipic anhydride and ethylenically unsaturated compounds such as styrene, vinyl acetate, vinyl methyl ketone, acrolein, etc. Also these and other oxymethylene polymers are disclosed by Sittig in Petroleum Refiner, vol. 41, No. 11, November 1962, pp. 131 through 170.

In addition to the above-mentioned oxymethylene copolymers, oxymethylene homopolymers of trioxane or formaldehyde may also be used in the present invention. It may be desirable to "end cap" the homopolymer molecules by the known methods of etherification or esterification.

If desired, the oxymethylene polymers may also contain any suitable coloring agents, additives or fillers, including glass, carbon black, titanium dioxide, finely divided copper and the like. In addition, chemical stabilizers such as scission inhibitors, which are well known and frequently used with oxymethylene polymers, may be added.

The present invention is additionally illustrated by the following examples.

EXAMPLE I

A commercial oxymethylene copolymer of trioxane and ethylene oxide was molded into flat sheets. A coating, as listed below, was applied to one surface of each of the polymer sheets, except for a control run which used a polymer sheet without any coating.

The control and coated sheets were then subjected to a water permeation test lasting for a period of four weeks during which time water at about 50° C. was maintained in contact with the sheets. At the end of the four week period a permeation factor (P) was calculated for each of the sheets. The permeation factor is the number of grams per day that permeate through a 100 square inch area having a 1 mil thickness. Hence, the P factor takes into account any difference in thickness among the coated sheets as well as the control run which had no coating.

Table A

| Coating: | P factor [1] |
|---|---|
| Control run—oxymethylene copolymer sheet without any coating | 25–30 |
| Paraffin wax | 11 |
| Tuffin 10 ( paraffinic wax, melting point 136° F., congealing point 131° F.) | 4.2 |
| Tuffin 30 (paraffinic wax, melting point 158° F., congealing point 153° F.) | 12 |
| Microcrystalline wax (melting point 180° F.) | 1.10 |
| Microcrystalline wax (melting point 195° F.) | 0.5 |

[1] Gms./day permeating 100 square inches at 1 mil.

The microcrystalline waxes adhered very well to the oxymethylene polymer surface, while the other coating materials were easily separated from the polymer surface. In addition, Table A clearly illustrates the superior reduction in water permeation obtained with microcrystalline waxes.

EXAMPLE II

Permeation tests, as in Example I above, were run on a series of heat-extruded films that were prepared from a blend of microcrystalline wax and oxymethylene terpolymer (trioxane, ethylene oxide, and butane diol diglycidyl ether). The blend of polymer and wax was prepared by dissolving microcrystalline wax (melting point 195° F.) in cyclohexane and then adding the oxymethylene terpolymer to the solvent mixture. The amount of wax added to the solvent was varied according to the percentage of wax desired in the final blend. Three polymer-wax blends were prepared, having microcrystalline wax contents as follows: 0.05 percent, 0.1 percent and 0.2 percent. A control sample was also prepared containing no microcrystalline wax. The materials were mixed in a Banbury blender and the solvent removed by drying. The control and blended materials were then heat extruded into films, which were subjected to the permeation tests.

Table B

| Blend: | P factor [1] |
|---|---|
| Control (no wax) | 58 |
| 0.05% | 43 |
| 0.10% | 46 |
| 0.20% | 47 |

[1] See footnote 1 to Table A.

All three blends reduced the water permeation of the oxymethylene polymer film by more than 15 percent and the blend containing 0.05 percent microcrystalline wax reduced such permeation by about 25 percent.

The microcrystalline wax can be applied to an oxymethylene polymer having an desired shape to reduce water permeation. Preferably the microcrystalline wax is coated on the interior of an oxymethylene polymer container or bottle, or on both the interior and exterior.

The principle, preferred embodiments, and modes of operation of the present invention have been described in the foregoing specification. However, it should be understood that the invention which is intended to be protected herein, may be practiced otherwise than as described.

What is claimed is:

1. An oxymethylene polymer article having enhanced resistance to water permeation which comprises an oxymethylene polymer having a coating on at least one surface thereof consisting essentially of a microcrystalline wax, in the range of from about 0.2 to about 10 mils in thickness.

2. The article of claim 1 wherein the oxymethylene polymer comprises at least 60 mol percent of recurring oxymethylene units.

3. The article of claim 1 wherein the oxymethylene polymer comprises recurring oxymethylene units interspaced with —OR— groups in the main polymer chain, wherein R is a divalent radical containing at least two carbon atoms directly linked to each other and positioned in the polymer chain between the two valences, with any substituents on said R radical being inert.

References Cited

UNITED STATES PATENTS

| 2,456,387 | 12/1948 | Cooper | 260—28.5 X |
| 2,599,130 | 6/1952 | Rumberger et al. | 117—168 X |
| 2,753,275 | 7/1956 | Wiles et al. | 117—168 X |
| 2,773,812 | 12/1956 | Tench | 117—168 X |
| 2,983,624 | 5/1961 | Thompson | 117—68 |
| 2,983,664 | 5/1961 | Camilli | 260—28 X |
| 3,132,040 | 5/1964 | Charles-Messance | 117—68 |
| 3,199,701 | 8/1965 | Santelli | 117—95 X |
| 3,210,210 | 10/1965 | Ball et al. | 117—138.8 |
| 3,211,701 | 10/1965 | Muller et al. | 260—28 X |
| 3,227,668 | 1/1966 | Ackermann | 260—28 |
| 3,231,529 | 1/1966 | Kuhn et al. | 260—28.5 X |

FOREIGN PATENTS 113,914    5/1945    Australia.

WILLIAM D. MARTIN, Primary Examiner

J. E. MILLER, JR., Assistant Examiner

U.S. Cl. X.R.

117—95, 168

UNITED STATES PATENT OFFICE
CERTIFICATE OF CORRECTION

Patent No. 3489600　　　　　　　　　　Dated January 13, 1970

Inventor(s) John S. Millar

It is certified that error appears in the above-identified patent and that said Letters Patent are hereby corrected as shown below:

In claim 3, column 6, lines 24-25 "interspaced" should read --interspersed--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents